(12) United States Patent
Chrabascz et al.

(10) Patent No.: US 9,964,120 B2
(45) Date of Patent: May 8, 2018

(54) FAN SHROUD

(71) Applicant: Hamilton Sundstrand Corporation, Windsor Locks, CT (US)

(72) Inventors: Eric Chrabascz, Longmeadow, MA (US); Seth E. Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 323 days.

(21) Appl. No.: 14/989,175

(22) Filed: Jan. 6, 2016

(65) Prior Publication Data

US 2017/0191499 A1    Jul. 6, 2017

(51) Int. Cl.

| | |
|---|---|
| *F04D 29/60* | (2006.01) |
| *F04D 29/52* | (2006.01) |
| *B64D 13/06* | (2006.01) |
| *F04D 19/00* | (2006.01) |
| *F04D 29/64* | (2006.01) |
| *F04D 25/04* | (2006.01) |

(52) U.S. Cl.
CPC .......... *F04D 29/526* (2013.01); *B64D 13/06* (2013.01); *F04D 19/002* (2013.01); *F04D 25/045* (2013.01); *F04D 29/644* (2013.01); *B64D 2013/0648* (2013.01); *B64D 2013/0662* (2013.01); *Y02T 50/44* (2013.01); *Y02T 50/56* (2013.01)

(58) Field of Classification Search
CPC .... F04D 29/526; F04D 19/002; F04D 25/045; F04D 29/644; B64D 13/06; B64D 2013/0648; B64D 2013/0662; Y02T 50/44; Y02T 50/56
See application file for complete search history.

(56) References Cited

U.S. PATENT DOCUMENTS 6,151,909 A * 11/2000 Carter ................... B64D 13/08
62/402
2014/0199167 A1   7/2014 Beers et al.

* cited by examiner

*Primary Examiner* — Richard Edgar
(74) *Attorney, Agent, or Firm* — Kinney & Lange, P.A.

(57) ABSTRACT

A fan shroud for an air cycle machine includes a tubular body extending axially between a first end and a second end of the shroud along a center axis of the fan shroud. A flange extends radially outward from the tubular body of the shroud at the first end of the shroud. At least one mounting hole extends through the flange. A sight hole extends through the flange and is positioned radially inward from the at least one mounting hole relative the center axis.

13 Claims, 3 Drawing Sheets

FAN SHROUD

BACKGROUND

The present invention relates to Air Cycle Machines (ACMs) used in aircraft environmental control systems, and more specifically to a fan and compressor housing for use in ACMs.

Conventional aircraft environmental control systems incorporate an ACM for cooling and dehumidifying air supplied to an aircraft cabin. ACMs generally include a compressor section to compress air. The compressed air is discharged to a downstream heat exchanger and further routed to a turbine. The turbine extracts energy from the expanded air to drive the compressor. The air output from the turbine is generally utilized as an air supply for a vehicle, such as the cabin of an aircraft. ACMs can be used to achieve a desired pressure, temperature, and humidity in the air that is transferred to the environmental control system of the aircraft.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft. In any configuration, a first airflow can be directed into the compressor section and a second airflow can be directed into the fan section. After the first airflow is compressed by the compressor, the first airflow can be directed to a heat exchanger to cool the first airflow to a desired temperature before the first airflow travels to the turbine or turbines. The second airflow is directed by the fan section towards the heat exchanger to cool the first airflow.

The fan section includes a row of fan blades that rotate to draw the second airflow into the fan section and onto the heat exchanger. In the event that one of the fan blades of the fan section should break free of the common shaft during operation, the severed fan blade could impact and damage the housing of the fan section. In traditional ACMs, the housing surrounding the fan section is often integral with the housing of the compressor section, forming a single component with a complex geometry that is expensive to repair or replace.

SUMMARY

In one aspect of the invention, a fan shroud for an air cycle machine includes a tubular body extending axially between a first end and a second end of the shroud along a center axis of the fan shroud. A flange extends radially outward from the tubular body of the shroud at the first end of the shroud. At least one mounting hole extends through the flange. A sight hole extends through the flange and is positioned radially inward from the at least one mounting hole relative the center axis.

In another aspect of the invention, a fan housing for an air cycle machine includes a fan exit flow passage and a ring disposed around a center axis of the fan housing and disposed around the fan exit flow passage. The ring includes a first end disposed axially opposite a second end, the first end being disposed downstream from the second end. The ring also includes a shelf disposed radially inward from the first end of the ring. The shelf is also disposed upstream from the first end of the ring and downstream from the second end of the ring. The fan housing also includes a fan shroud. The fan shroud has a tubular body extending axially from a first end to a second end of the shroud along the center axis of the fan housing. The second end of the shroud extends toward the shelf of the ring. A flange extends radially outward from the tubular body of the shroud at the first end of the shroud and the flange is disposed proximate the first end of the ring. At least one mounting hole extends through the flange. A sight hole also extends through the flange and is positioned radially inward from the at least one mounting hole and radially inward from the first end of the ring.

Persons of ordinary skill in the art will recognize that other aspects and embodiments of the present invention are possible in view of the entirety of the present disclosure, including the accompanying figures.

Figure 1:
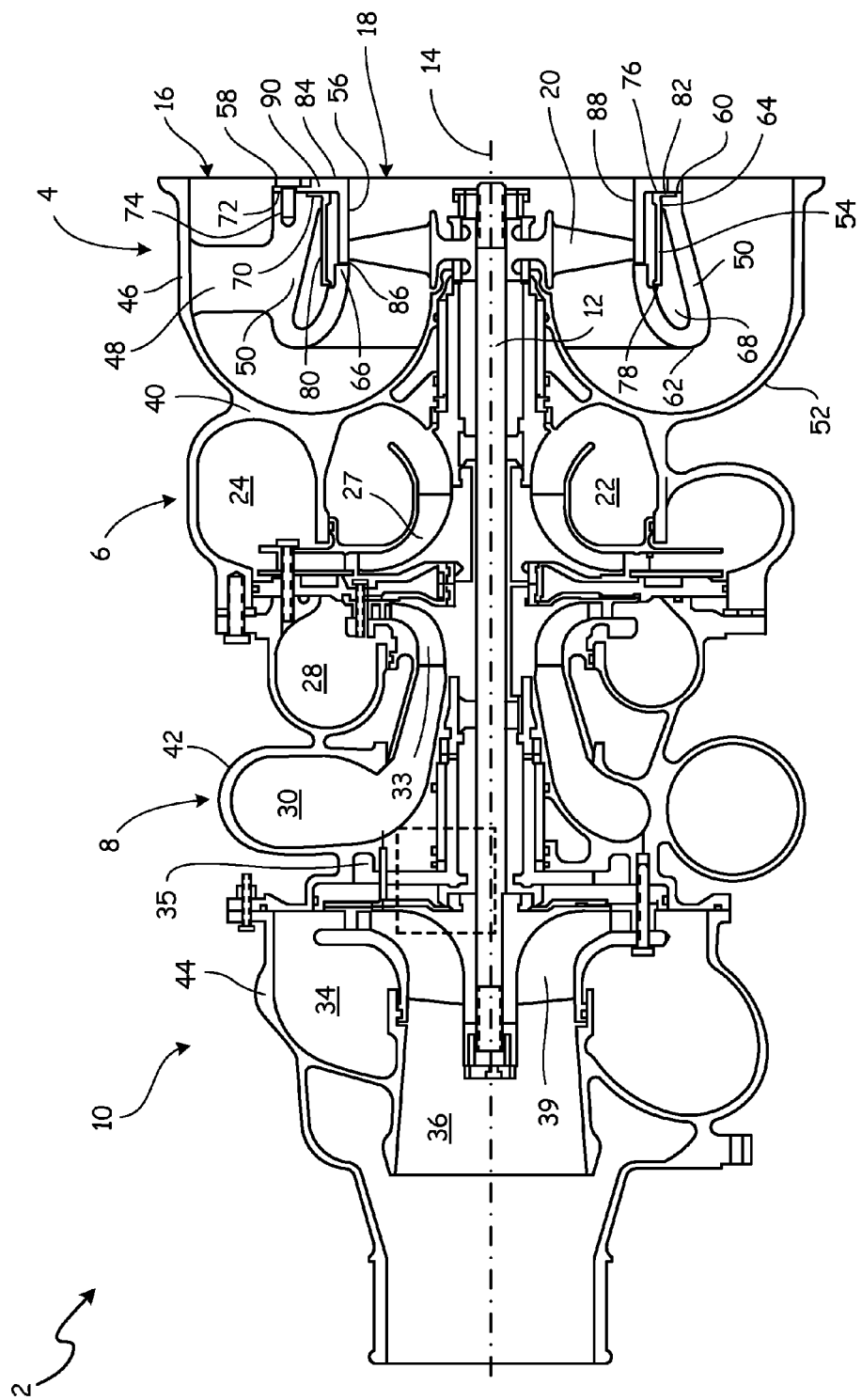
FIG. 1 is a cross-sectional view of an embodiment of an air cycle machine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The invention relates to a fan and compressor housing for an air cycle machine (ACM) that includes a detachable fan shroud and containment ring. In the event that a fan blade of the ACM should break and impact the fan and compressor housing, the fan shroud and the containment ring will absorb the majority of the impact of the fan blade, thereby preserving the rest of the fan and compressor housing and reducing the cost to repair the ACM. The fan shroud includes the additional benefit of a sight hole that allows for visual confirmation of the presence of the containment ring by an operator during maintenance of the ACM. The fan shroud also includes dimensions and dimensional ratios that are selected to ensure proper radial alignment between the sight hole and the containment ring. Some exemplary embodiments of the piston are discussed below with reference to the figures.

FIG. 1 is a cross-sectional view of ACM 2. ACM 2 is a four-wheel ACM, containing fan section 4, compressor section 6, first turbine section 8, and second turbine section 10, which are all connected to shaft 12 for common rotation about center axis 14. It should be noted that ACM 2 is shown and described merely by way of example and not limitation. Numerous other ACM configurations are possible in further embodiments, such as for three-wheel ACMs.

When a first working fluid passes through ACM 2, the first working fluid is first compressed in compressor section 6, and then expanded in first turbine section 8 and second turbine section 10. Often, the first working fluid is cooled in a heat exchanger (not shown) through which the first working fluid is routed as the first working fluid passes between compressor section 6 and first turbine section 8. First turbine section 8 and second turbine section 10 extract energy from the first working fluid, turning shaft 12 about center axis 14. Meanwhile, a second working fluid is routed through the same heat exchanger by fan section 4. For example, the first working fluid can be routed from a bleed valve of a gas turbine engine through compressor section 6, to a heat exchanger, to first turbine section 8, then to second turbine section 10, and then to the environmental control system of an aircraft. The second working fluid can be ram air that is pulled by fan section 4 through the same heat exchanger to cool the first working fluid to a desired temperature before routing of the first working fluid to the turbine sections 8 and 10. By compressing, temperature treating, and expanding the working fluid, the output provided at the second turbine 10 can be adjusted to a desired temperature, pressure, and/or relative humidity.

Fan section 4 includes fan inlet 16 and fan outlet 18. Fan inlet 16 is an opening in ACM 2 that receives the second working fluid from another source, such as a ram air scoop. Fan outlet 18 allows the second working fluid to escape fan section 4. Fan blades 20 can be used to draw the second working fluid into fan section 4.

Compressor section 6 includes compressor inlet 22, compressor outlet 24, and compressor blades 27. Compressor inlet 22 is a duct defining an aperture through which the first working fluid to be compressed is received from another source. Compressor inlet 22 directs the first working fluid from compressor inlet 22 to compressor blades 27 where the first working fluid is compressed before entering compressor outlet 24. Compressor outlet 24 allows the first working fluid to be routed to other systems after the first working fluid has been compressed.

First turbine section 8 includes first stage turbine inlet 28, first stage turbine outlet 30, and first turbine blades 33. First stage turbine inlet 28 is a duct defining an aperture through which the first working fluid passes prior to expansion in first turbine section 8. First stage turbine outlet 30 is a duct defining an aperture through which the first working fluid (which has expanded) departs first turbine section 8. First stage turbine blades 33 are disposed in the flow path between first stage turbine inlet 28 and outlet 30 and extract energy from the first working fluid passing therethrough, driving the rotation of first turbine section 8 and attached components, including shaft 12, fan section 4, and compressor section 6.

Second turbine section 10 includes second stage turbine inlet 34, second stage turbine outlet 36, and second stage turbine blades 39. Second stage turbine inlet 34 is a duct defining an aperture through which the first working fluid passes prior to expansion in second turbine section 10. Second stage turbine outlet 36 is a duct defining an aperture through which the first working fluid (which has expanded) departs second turbine section 10. Second stage turbine blades 39 are disposed in the flow path between second stage turbine inlet 34 and second stage turbine outlet 36 and extract energy from working fluid passing therethrough, driving the rotation of second turbine section 10 and attached components, including shaft 12, fan section 4, and compressor section 6. The first working fluid passes from second stage turbine inlet 34 to cavity 35, where the first working fluid is incident upon second stage turbine blades 39. The first working fluid can then pass across vanes or nozzles that help guide and straighten the flow of the first working fluid for optimum efficiency. The flow of the first working fluid causes turbine blades 39 to rotate and turn shaft 12.

Shaft 12 can be a rod, such as a titanium tie-rod, used to connect other components of ACM 2. Center axis 14 is an axis with respect to which other components can be arranged. Shaft 12 can mechanically connect fan section 4 to compressor section 6. Fan section 4 and compressor section 6 can also include fan and compressor housing 40. Fan and compressor housing 40 can enclose both the moving parts and air paths through fan section 4 and compressor section 6. The size and geometry of fan and compressor housing 40 define the flow of air through ACM 2. Fan and compressor housing 40 can be sized to coordinate with adjacent housing sections, such as first turbine housing 42 and second turbine housing 44.

As shown in FIG. 1, fan and compressor housing 40 can include outer ring 46, struts 48, inner ring 50, curved wall 52, containment ring 54, shroud 56, and fasteners 58. Inner ring 50 can include first end 60, second end 62, guide surface 64, shelf 66, cavity 68, recess 70, mounting surface 72, and mounting holes 74. Containment ring 54 can include first end 76, second end 78, tubular body 80, and flange 82. Shroud 56 can include first end 84, second end 86, tubular body 88, and mounting flange 90.

Figure 2:
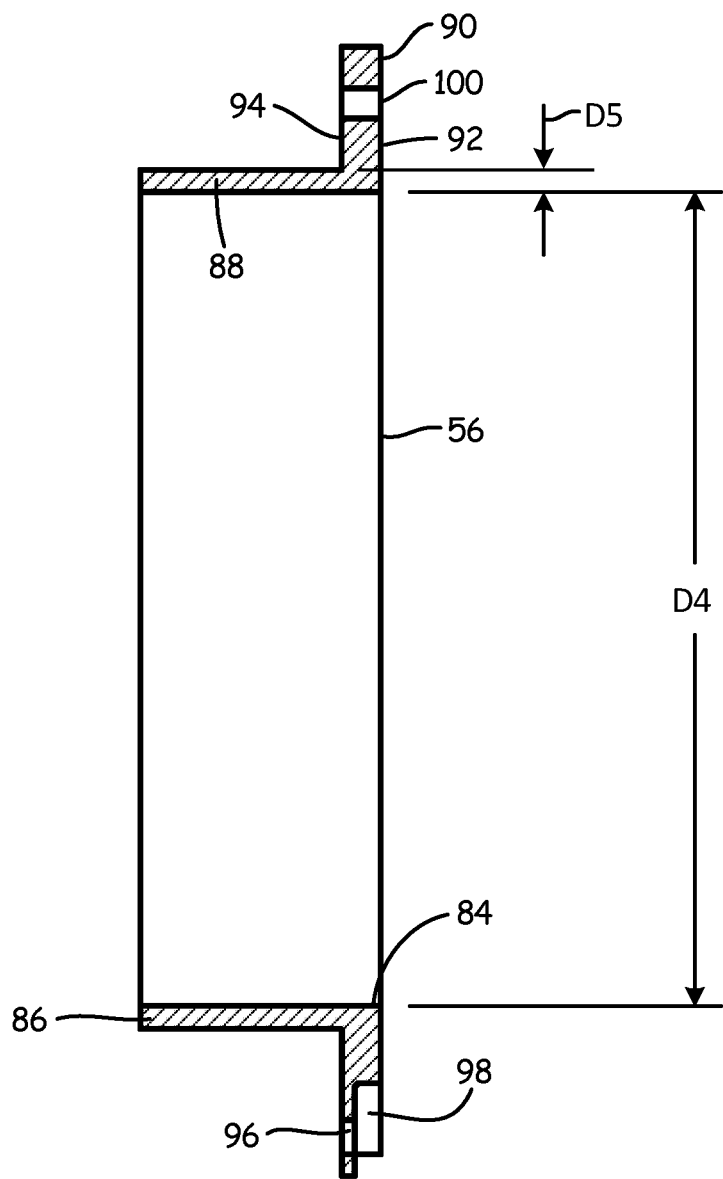
FIG. 2 is a cross-sectional view of a fan shroud from the air cycle machine of FIG. 1.
Figure 3:
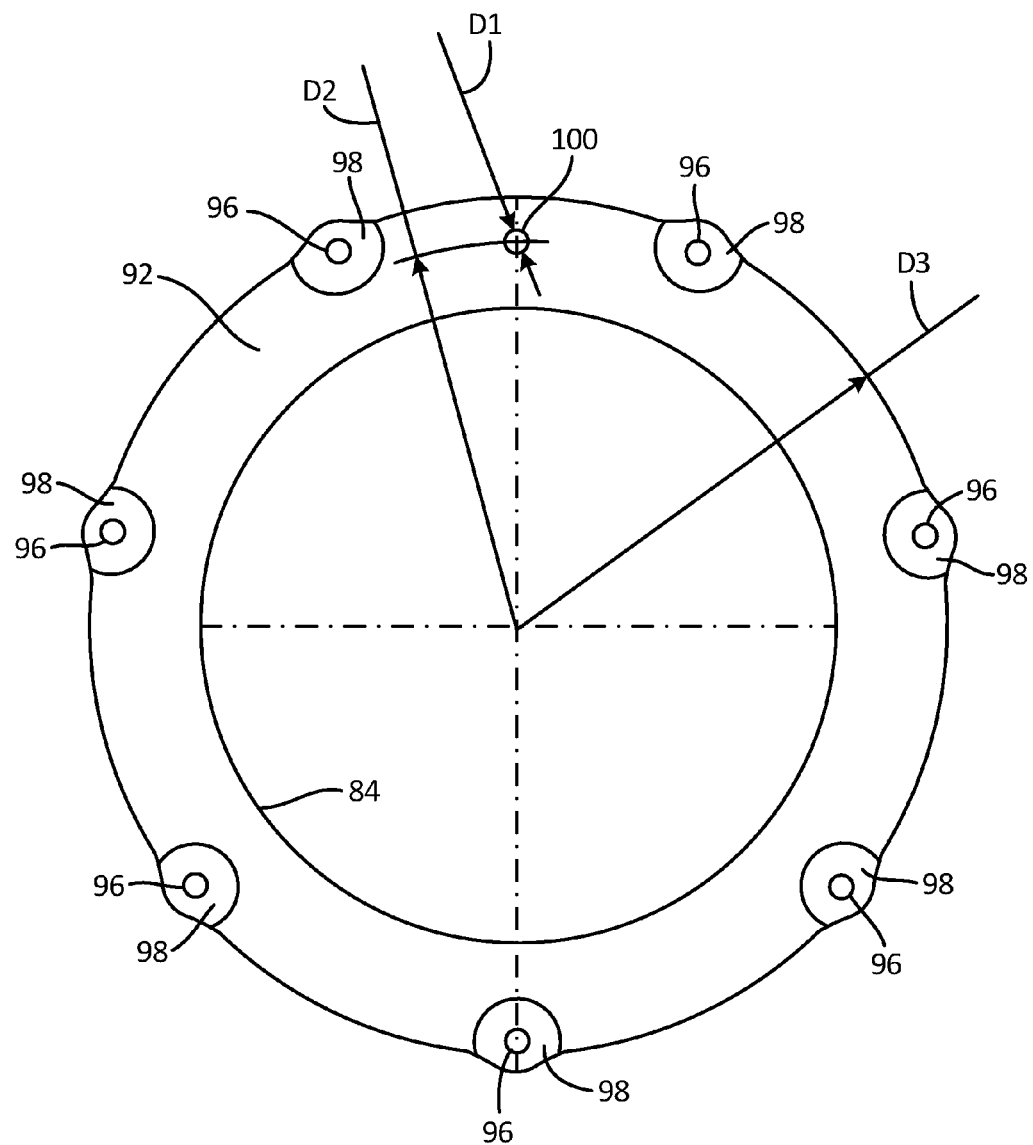
FIG. 3 is an elevation view of a first end of the fan shroud from FIG. 2.

Outer ring 46 is disposed around center axis 14. Center axis 14 can be the center axis for both ACM 2 and fan and compressor housing 40. Inner ring 50 is disposed radially inward from outer ring 46 and struts 48 are circumferentially spaced from one another and can extend radially inward from outer ring 46 to inner ring 50. Struts 48 are connected to both inner ring 50 and outer ring 46 and can space outer ring 46 radially opposite inner ring 50 to form fan inlet 16. Inner ring 50 forms fan outlet 18 and is disposed around fan blades 20. Curved wall 52 can be connected to outer ring 46 and can curve 180 degrees towards fan blades 20. Curved wall 52, along with inner ring 50, forms a curved flow passage between fan inlet 16 and fan outlet 18, thereby allowing the working fluid entering fan inlet 16 to turn 180 degrees before exiting fan section 4 through fan outlet 18. As shown in FIGS. 1-3, outer ring 46, struts 48, inner ring 50, and curved wall 52 can all be integral and can be formed as a unitary part through a casting process. Outer ring 46, struts 48, inner ring 50, and curved wall 52 can be formed from aluminum or an aluminum alloy, such as 6061 aluminum alloy, or any other material that can be readily shaped into the geometry of fan and compressor housing 40 while meeting the operating conditions of ACM 2.

Containment ring 54 and shroud 56 can be disposed radially inward of inner ring 50 and disposed radially outward of fan blades 20. Should one of fan blades 20 disconnect from shaft 12 during operation of ACM 2, also known as a "blade out event," containment ring 54 and shroud 56 are configured to absorb the forces from the impact of the disconnected fan blade 20, thereby protecting the rest of fan and compressor housing 40 from damage. As shown in FIG. 1, containment ring 54 can include tubular body 80 extending axially between first end 76 of containment ring 54 and second end 78 of containment ring 54 along center axis 14. Flange 82 of containment ring 54 can extend radially outward from tubular body 80 at first end 76 of containment ring 54. Containment ring 54 can be formed from steel, such as 4130 steel, or any other material suitable to contain impacts from fan blades 20. Shroud 56 can include tubular body 88 extending axially between first end 84 of shroud 56 and second end 86 of shroud 56 along center axis 14. Shroud 56 can also include mounting flange 90 extending radially outward from tubular body 88 of shroud 56 at first end 84 of shroud 56. Shroud 56 can be formed from aluminum or an aluminum alloy, such as 6061 aluminum alloy, or any other material that can be shaped into the geometry of shroud 56 while meeting the operating conditions of ACM 2.

Containment ring 54 and shroud 56 are releasably connected to inner ring 50 so that containment ring 54 and shroud 56 can be quickly disconnected from inner ring 50 and replaced after a blade out event. Inner ring 50 includes guide surface 64, shelf 66, recess 70, mounting surface 72, and mounting holes 74 to aid in releasably connecting containment ring 54 and shroud 56 to inner ring 50. As shown in FIG. 1, first end 60 of inner ring 50 is disposed axially opposite second end 62 of inner ring 50. Guide surface 64 can be formed between first end 60 and second end 62 of inner ring 50 and faces radially inward relative center axis 14. Shelf 66 can be disposed radially inward from guide surface 64 and positioned axially between first end 60 and second end 62 of inner ring 50.

Recess 70 is formed on first end 60 of inner ring 50. Recess 70 can be a counterbore that extends axially between first end 60 and guide surface 64, and extends radially inward to guide surface 64. Mounting surface 72 can also be disposed at first end 60 of inner ring 50 and can extend radially outward from recess 70. Mounting holes 74 can be formed in mounting surface 72 and first end 60 of inner ring 50, and can be spaced circumferentially from one another on mounting surface 72.

When assembling containment ring 54 and shroud 56 onto inner ring 50, second end 78 of tubular body 80 of containment ring 54 is positioned so that second end 78 of tubular body 80 of containment ring 54 can extend onto shelf 66. With second end 78 of tubular body 80 of containment ring 54 positioned onto shelf 66, tubular body 80 of containment ring 54 can be positioned against guide surface 64, and flange 82 of containment ring 54 can extend into recess 70 of inner ring 50 proximate first end 60 of inner ring 50. Cavity 68 can also be formed in inner ring 50 and can be positioned radially inward from shelf 66 and guide surface 64 to reduce the overall weight of inner ring 50 and ACM 2. Reducing the weight of ACM 2 is beneficial in that a reduction of weight in ACM 2 translates into weight reduction and improved fuel efficiency of an aircraft incorporating ACM 2. Cavity 68 can also aid in the assembling of second end 78 of containment ring 54 onto shelf 66 of inner ring 50 by providing more clearance and space between shelf 66 and the rest of inner ring 50.

With containment ring 54 positioned onto inner ring 50, shroud 56 can then be attached onto inner ring 50 to secure containment ring 54 radially between inner ring 50 and shroud 56. When assembled onto inner ring 50, second end 86 of tubular body 88 of shroud 56 can be disposed radially inward from tubular body 80 of containment ring 54. Second end 86 of tubular body 88 can also be disposed proximate shelf 66 and radially aligned with shelf 66. Mounting flange 90 can be positioned against mounting surface 72 and first end 60 of inner ring 50 so that mounting flange 90 covers recess 70 and flange 82 of containment ring 54. With mounting flange 90 of shroud 56 placed against mounting surface 72, fasteners 58 can be inserted through mounting holes 96 in mounting flange 90 and into mounting holes 74 of inner ring 50 to secure shroud 56 and containment ring 54 to inner ring 50. Fasteners 58 can be threaded fasteners, such as screws or bolts. With flange 82 of containment ring 54 disposed in recess 70, second end 78 of containment ring 54 disposed on shelf 66, and mounting flange 90 of shroud 56 connected to mounting surface 72 of inner ring 50, containment ring 54 is unable to shift positions axially during operation of ACM 2, thereby ensuring containment ring 54 maintains axial position relative fan blades 20 should a blade out event occur. Guide surface 64, shelf 66, and tubular body 80 restrain radial movement and displacement of containment ring 54 during operation of ACM 2. As discussed below with reference to FIGS. 2 and 3, shroud 56 can include sight hole 100 to allow visual verification of the presence of containment ring 54 in ACM 2.

FIGS. 2 and 3 will be discussed concurrently. FIG. 2 is a cross-sectional view of shroud 56 from ACM 2 of FIG. 1. FIG. 3 is an elevation view of first end 84 of shroud 56 from FIG. 2. As shown in FIGS. 2 and 3, mounting flange 90 of shroud 56 can include first side 92, second side 94, mounting holes 96, counterbore recesses 98, and sight hole 100.

First side 92 of mounting flange 90 is disposed opposite second side 94 of mounting flange 90. When shroud 56 is assembled onto inner ring 50, second side 94 of mounting flange 90 is disposed against mounting surface 72 of inner ring 50. Mounting holes 96 can extend completely through mounting flange 90 of shroud 56 and can be radially and circumferentially aligned with mounting holes 74 of inner ring 50 (only one of which is shown in FIG. 1). Each of counterbore recesses 98 can be formed on first side 92 of mounting flange 90 and around one of mounting holes 96. Counter bore recesses 98 allow working heads of fasteners 58 (shown in FIG. 1) to be flush with first side 92 of mounting flange 90 when assembled onto ACM 2.

Sight hole 100 can also extend through mounting flange 90 of shroud 56 and can be positioned radially inward from mounting holes 96 relative center axis 14. Sight hole 100 is positioned on mounting flange 90 so that sight hole 100 is radially aligned with at least a portion of containment ring 54 when shroud 56 is connected to inner ring 50. As shown by way of example in FIG. 1, sight hole 100 can be positioned radially inward from first end 60 of inner ring 50 so that sight hole 100 is radially aligned with flange 82 of containment ring 54. Should a technician accidentally fail to include containment ring 54 during the maintenance or initial assembly of ACM 2, fan and compressor housing 40 could be subject to more extensive and costly damage should a blade out event occur. The provision and location of sight hole 100 on mounting flange 90 of shroud 56 allows the technician the ability to visually verify the presence of containment ring 54 in ACM 2 before ACM 2 is incorporated into an aircraft.

To ensure sight hole 100 is large enough to view containment ring 54, sight hole 100 can include a diameter D1 that is approximately 0.4648 cm (0.1830 inches) to approximately 0.4902 cm (0.1930 inches) in length. To ensure sight hole 100 is adequately positioned on mounting flange 90, the center of sight hole 100 can be spaced radially on mounting flange 90 a distance D2 from center axis 14. Distance D2 can be approximately 8.0860 cm (3.1835 inches) to approximately 8.1191 cm (3.1965 inches) in length. A ratio (D1/D2) of the diameter D1 of sight hole 100 and the distance D2 can be approximately 0.0570 to approximately 0.0600. Mounting flange 90 can include an outer radius D3 that is approximately 9.0170 cm (3.5500 inches) in length. A ratio (D2/D3) of the distance D2 and the outer radius D3 of mounting flange 90 can be approximately 0.8967 to approximately 0.9004.

Tubular body 88 of shroud 56 can also be sized to aid containment ring 54 in buttressing fan and compressor housing 40 against impacts in blade out events. Tubular body 88 of shroud 56 can include an inner diameter D4 and a radial thickness D5. Inner diameter D4 of tubular body 88 can be approximately 13.2994 cm (5.2360 inches) to approximately 13.3146 cm (5.2420 inches) in length. Radial thickness D5 can be approximately 0.3429 cm (0.1350 inches) to approximately 0.3937 cm (0.1550 inches) in length. A ratio (D4/D5) of the inner diameter D4 of tubular body 80 and radial thickness D5 of the tubular body can be approximately 33.7806 to approximately 38.8296. A ratio (D3/D4) of the outer radius D3 of mounting flange 90 and the inner diameter D4 of tubular body 88 can be approximately 0.6772 to approximately 0.6779. Table 1 is provided below with a list of values for dimensions D1, D2, D3, D4, and D5 along with the above stated ratios.

TABLE 1

| | |
|---|---|
| D1 | 0.4648 cm-0.4902 cm |
| D2 | 8.0860 cm-8.1191 cm |
| D3 | 9.0170 cm-9.0170 cm |
| D4 | 13.2994 cm-13.3146 cm |
| D5 | 0.3429 cm-0.3937 cm |
| D1/D2 | 0.0570-0.0600 |
| D2/D3 | 0.8967-0.9004 |
| D3/D4 | 0.6772-0.6779 |
| D4/D5 | 33.7806-38.8296 |

In view of the foregoing description, it will be recognized that the present disclosure provides numerous advantages and benefits. For example, the present disclosure provides ACM 2 with fan and compressor housing 40. Fan and compressor housing includes inner ring 50 with guide surface 64, shelf 66, and recess 70 that allow for removable connection of containment ring 54 and shroud 56. Should a blade out event occur in fan section 4 of ACM 2, containment ring 54 and shroud 56 are configured to absorb the majority of the energy and damage caused by the blade out event, sparing the rest of fan and compressor housing 40 from significant damage. After a blade out event, containment ring 54 and shroud 56 can be removed from inner ring 50 of fan and compressor housing 40 and replaced. Cost savings are obtained because containment ring 54 and shroud 56 are relatively cheap to replace in comparison to the cost of replacing all of compressor housing 40. Furthermore, shroud 56 includes sight hole 100 that provides a window of sight to containment ring 54. Before ACM 2 is assembled onto an aircraft, an operator can use sight hole 100 to inspect containment ring 54 and verify that containment ring 54 is actually present in ACM 2 and was not left out by accident during initial assembly or maintenance of ACM 2. Because sight hole 100 is placed on mounting flange 90 of shroud 56, sight hole 100 also does not interfere with the flow of working fluid through fan section 4.

The following are non-exclusive descriptions of possible embodiments of the present invention.

In one embodiment, a fan shroud for an air cycle machine includes a tubular body extending axially between a first end and a second end of the shroud along a center axis of the fan shroud. A flange extends radially outward from the tubular body of the shroud at the first end of the shroud. At least one mounting hole extends through the flange. A sight hole extends through the flange and is positioned radially inward from the at least one mounting hole relative the center axis.

The fan shroud of the preceding paragraph can optionally include, additionally and/or alternatively, any one or more of the following features, configurations and/or additional components:

the sight hole comprises a diameter D1, wherein the sight hole is spaced radially on the flange a distance D2 from the center axis of the fan shroud, and wherein a ratio of the diameter D1 of the sight hole and the distance D2 is 0.0570 to 0.0600;

the flange comprises an outer radius D3, and wherein a ratio of the distance D2 and the outer radius D3 of the flange is 0.8967 to 0.9004;

the tubular body of the shroud comprises an inner diameter D4, and wherein a ratio of the outer radius D3 of the flange and the inner diameter D4 of the tubular body is 0.6772 to 0.6779;

the tubular body of the shroud comprises a radial thickness D5, and wherein a ratio of the inner diameter D4 of the tubular body and the radial thickness D5 of the tubular body is 33.7806 to 38.8296; and/or the flange of the fan shroud comprises a first side and a second side and a recess formed on the first side of the flange and around the at least one mounting hole.

In another embodiment, a fan housing for an air cycle machine includes a fan exit flow passage and a ring disposed around a center axis of the fan housing and disposed around the fan exit flow passage. The ring includes a first end disposed axially opposite a second end, the first end being disposed downstream from the second end. The ring also includes a shelf disposed radially inward from the first end of the ring. The shelf is also disposed upstream from the first end of the ring and downstream from the second end of the ring. The fan housing also includes a fan shroud. The fan shroud has a tubular body extending axially from a first end to a second end of the shroud along the center axis of the fan housing. The second end of the shroud extends toward the shelf of the ring. A flange extends radially outward from the tubular body of the shroud at the first end of the shroud and the flange is disposed proximate the first end of the ring. At least one mounting hole extends through the flange. A sight hole also extends through the flange and is positioned radially inward from the at least one mounting hole and radially inward from the first end of the ring.

The fan housing of the preceding paragraph can optionally include, additionally and/or alternatively, any one or more of the following features, configurations and/or additional components:

the fan housing further comprising: a containment ring disposed radially between the ring and the fan shroud;

the sight hole is radially aligned with at least a portion of the containment ring;

the sight hole comprises a diameter D1, wherein the sight hole is spaced radially on the flange a distance D2 from the center axis of the fan shroud, and wherein a ratio of the diameter D1 of the sight hole and the distance D2 is 0.0570 to 0.0600;

the flange comprises an outer radius D3, and wherein a ratio of the distance D2 and the outer radius D3 of the flange is 0.8967 to 0.9004;

the tubular body of the shroud comprises an inner diameter D4, and wherein a ratio of the outer radius D3 of the flange and the inner diameter D4 of the tubular body is 0.6772 to 0.6779; and/or the tubular body of the shroud comprises a radial thickness D5, and wherein a ratio of the inner diameter D4 of the tubular body and the radial thickness D5 of the tubular body is 33.7806 to 38.8296.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIG. 1 shows the invention implemented in a four-wheel ACM, the invention can also be used in three-wheel ACMs. In addition, many modifications may be made to adapt a particular situation or material to the teachings of the invention without departing from the essential scope thereof. For example, while FIGS. 1-3 show fan and compressor housing 4 as a single casing for both fan section 4 and compressor section 6, fan and compressor housing 4 can be divided into a fan housing that is a separate component from a compressor housing. Therefore, it is intended that the invention not be limited to the particular embodiment(s) disclosed, but that the invention will include all embodiments falling within the scope of the appended claims.

The invention claimed is:

1. A fan shroud for an air cycle machine, the fan shroud comprising:
   a tubular body extending axially between a first end and a second end of the fan shroud along a center axis of the fan shroud;
   a flange extending radially outward from the tubular body of the fan shroud at the first end of the fan shroud;
   at least one mounting hole extending through the flange; and
   a sight hole extending through the flange and positioned radially inward from the at least one mounting hole relative the center axis.

2. The fan shroud of claim 1, wherein the sight hole comprises a diameter D1, wherein the sight hole is spaced radially on the flange a distance D2 from the center axis of the fan shroud, and wherein a ratio of the diameter D1 of the sight hole and the distance D2 is 0.0570 to 0.0600.

3. The fan shroud of claim 2, wherein the flange comprises an outer radius D3, and wherein a ratio of the distance D2 and the outer radius D3 of the flange is 0.8967 to 0.9004.

4. The fan shroud of claim 3, wherein the tubular body of the shroud comprises an inner diameter D4, and wherein a ratio of the outer radius D3 of the flange and the inner diameter D4 of the tubular body is 0.6772 to 0.6779.

5. The fan shroud of claim 4, wherein the tubular body of the shroud comprises a radial thickness D5, and wherein a ratio of the inner diameter D4 of the tubular body and the radial thickness D5 of the tubular body is 33.7806 to 38.8296.

6. The fan shroud of claim 1, wherein the flange of the fan shroud comprises a first side and a second side and a recess formed on the first side of the flange and around the at least one mounting hole.

7. A fan housing for an air cycle machine, the fan housing comprising:
   a fan exit flow passage;
   a ring disposed around a center axis of the fan housing and disposed around the fan exit flow passage; wherein the ring comprises:
      a first end disposed axially opposite a second end, wherein the first end is disposed downstream from the second end; and
      a shelf disposed radially inward from the first end of the ring and disposed upstream from the first end of the ring and downstream from the second end of the ring; and
   a fan shroud, the fan shroud comprising:
      a tubular body extending axially from a first end to a second end of the fan shroud along the center axis of the fan housing, wherein the second end of the fan shroud extends toward the shelf of the ring;
      a flange extending radially outward from the tubular body of the fan shroud at the first end of the fan shroud, wherein the flange is disposed proximate the first end of the ring;
      at least one mounting hole extending through the flange; and
      a sight hole extending through the flange and positioned radially inward from the at least one mounting hole and radially inward from the first end of the ring.

8. The fan housing of claim 7, wherein the fan housing further comprising:
   a containment ring disposed radially between the ring and the fan shroud.

9. The fan housing of claim 8, wherein the sight hole is radially aligned with at least a portion of the containment ring.

10. The fan housing of claim 7, wherein the sight hole comprises a diameter D1, wherein the sight hole is spaced radially on the flange a distance D2 from the center axis of the fan shroud, and wherein a ratio of the diameter D1 of the sight hole and the distance D2 is 0.0570 to 0.0600.

11. The fan housing of claim 10, wherein the flange comprises an outer radius D3, and wherein a ratio of the distance D2 and the outer radius D3 of the flange is 0.8967 to 0.9004.

12. The fan housing of claim 11, wherein the tubular body of the shroud comprises an inner diameter D4, and wherein a ratio of the outer radius D3 of the flange and the inner diameter D4 of the tubular body is 0.6772 to 0.6779.

13. The fan housing of claim 12, wherein the tubular body of the shroud comprises a radial thickness D5, and wherein a ratio of the inner diameter D4 of the tubular body and the radial thickness D5 of the tubular body is 33.7806 to 38.8296.

* * * * *